(12) United States Patent
Okur et al.

(10) Patent No.: US 12,223,017 B2
(45) Date of Patent: Feb. 11, 2025

(54) SELF-ORGANIZED LEARNING OF THREE-DIMENSIONAL MOTION DATA

(71) Applicant: RAPSODO PTE. LTD., Singapore (SG)

(72) Inventors: Batuhan Okur, Singapore (SG); Roshan Gopalakrishnan, Singapore (SG)

(73) Assignee: Rapsodo Pte. Ltd., Singapore (SG)

(*) Notice: Subject to any disclaimer, the term of this patent is extended or adjusted under 35 U.S.C. 154(b) by 294 days.

(21) Appl. No.: 17/460,038

(22) Filed: Aug. 27, 2021

(65) Prior Publication Data
US 2023/0065922 A1   Mar. 2, 2023

(51) Int. Cl.
*G06F 18/25*   (2023.01)
*G01S 13/08*   (2006.01)
(Continued)

(52) U.S. Cl.
CPC ............ *G06F 18/251* (2023.01); *G01S 13/08* (2013.01); *G01S 13/587* (2013.01); *G01S 13/867* (2013.01);
(Continued)

(58) Field of Classification Search
CPC ...... G06F 18/251; G01S 13/08; G01S 13/587; G01S 13/867; G01S 13/89; G01S 7/417; G01S 13/72; G06T 7/215; G06T 7/80; G06T 2207/10028; G06T 2207/20081; G06T 2207/30224; G06T 2207/30221; G06T 7/246; G06T 2207/30241; G06V 40/23; G06V 40/28
See application file for complete search history.

(56) References Cited

U.S. PATENT DOCUMENTS 10,898,757 B1 * 1/2021 Johansson ............... G01S 13/89
2019/0391254 A1   12/2019 Asghar et al.
(Continued)

OTHER PUBLICATIONS

S. Mane and S. Mangale, "Moving Object Detection and Tracking Using Convolutional Neural Networks," 2018 Second International Conference on Intelligent Computing and Control Systems (ICICCS), Madurai, India, 2018, pp. 1809-1813, doi: 10.1109/ICCONS.2018.8662921. (Year: 2018).*

(Continued)

*Primary Examiner* — Nancy Bitar
*Assistant Examiner* — Dustin Bilodeau
(74) *Attorney, Agent, or Firm* — Scully, Scott, Murphy & Presser, P.C.

(57) ABSTRACT

A method may include capturing image data associated with an object in a defined environment at one or more points in time. The method may include capturing radar data associated with the object in the defined environment at the same points in time. The method may include obtaining, by a machine learning model, the image data and the radar data associated with the object in the defined environment. The method may include pairing each image datum with a corresponding radar datum based on a chronological occurrence of the image data and the radar data. The method may include generating, by the machine learning model, a three-dimensional motion representation associated with the object that is associated with the image data and the radar data.

20 Claims, 6 Drawing Sheets

(51) Int. Cl.
    *G01S 13/58*     (2006.01)
    *G01S 13/86*     (2006.01)
    *G01S 13/89*     (2006.01)
    *G06T 7/215*     (2017.01)
    *G06T 7/80*     (2017.01)
    *G06V 40/20*     (2022.01)

(52) U.S. Cl.
    CPC .............. *G01S 13/89* (2013.01); *G06T 7/215* (2017.01); *G06T 7/80* (2017.01); *G06V 40/23* (2022.01); *G06T 2207/10028* (2013.01); *G06T 2207/20081* (2013.01); *G06T 2207/30224* (2013.01)

(56) References Cited

U.S. PATENT DOCUMENTS

| | | | |
|---|---|---|---|
| 2020/0210726 A1* | 7/2020 | Yang | G01S 13/006 |
| 2020/0398137 A1 | 12/2020 | Tuxen et al. | |
| 2021/0042575 A1* | 2/2021 | Firner | G06N 3/04 |
| 2022/0138969 A1* | 5/2022 | Forsgren | G01S 13/867 |
| | | | 382/103 |
| 2022/0277520 A1* | 9/2022 | Ogasawara | A63F 13/52 |
| 2022/0314870 A1* | 10/2022 | Aimura | G06V 20/58 |

OTHER PUBLICATIONS

International Search Report and Written Opinion issued in corresponding application No. PCT/IB2022/058026, dated Apr. 10, 2023.

* cited by examiner

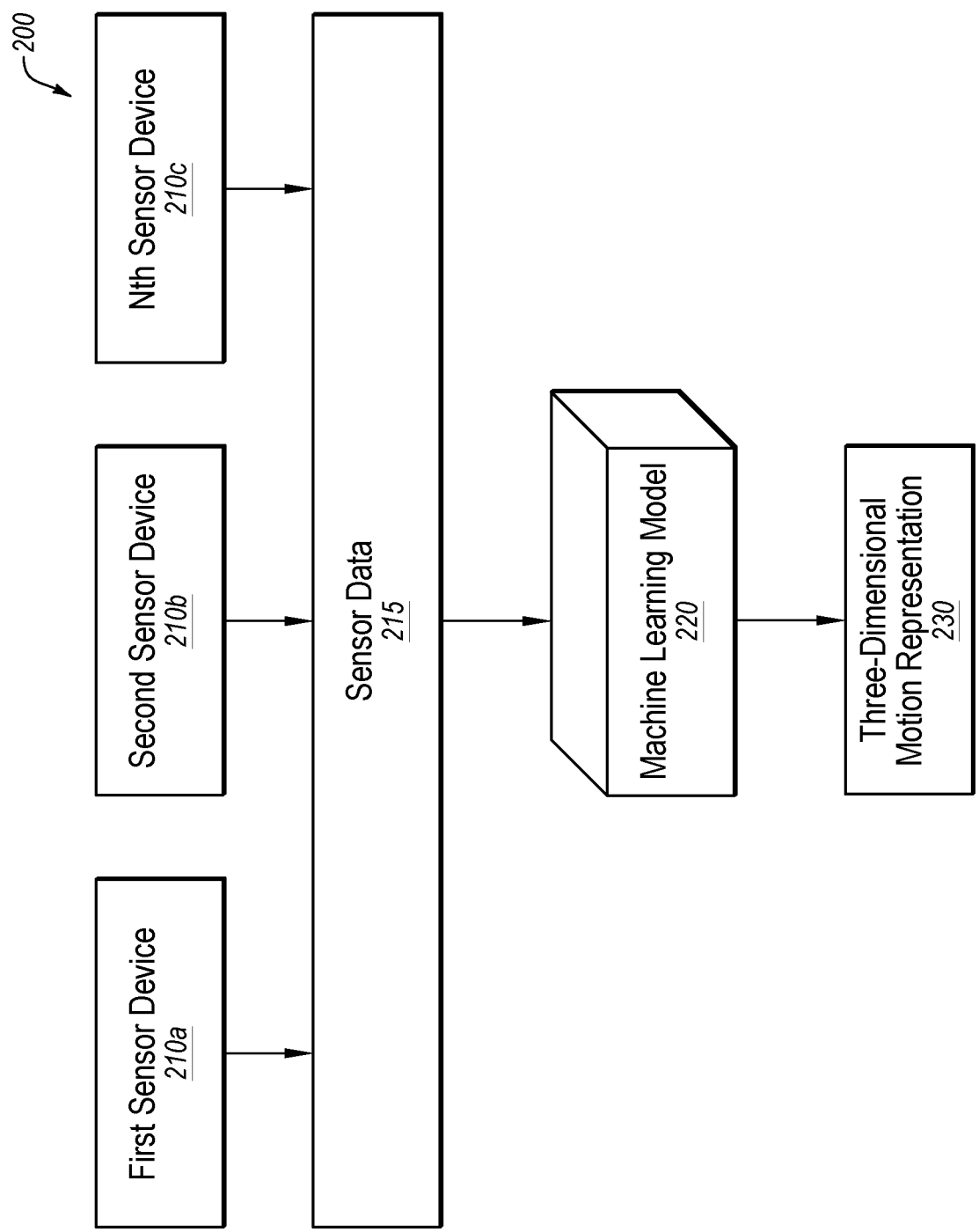

SELF-ORGANIZED LEARNING OF THREE-DIMENSIONAL MOTION DATA

The present disclosure generally relates to representation of three-dimensional motion of moving objects using self-organized learning on combined radar and image data.

BACKGROUND

A moving object may be represented by properties of the moving object such as its position, direction of movement, speed, velocity, or other factors. The moving object may include objects used in sports such as balls. Evaluating the properties of the moving object may provide information about performance and/or events occurring in a sport.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include capturing image data associated with an object in a defined environment at one or more points in time by multiple synchronized radar-camera units included in an image-capturing system. Radar data and/or image data captured by the radar-camera units may be processed, modified, and/or constructed to be viewed from one or more locations of the defined environment associated with a virtual camera. The method may include estimating intrinsic and extrinsic camera parameters of the virtual camera at the one or more locations within and/or around the defined environment to facilitate construction of the image data associated with the virtual camera.

The method may include capturing radar data associated with the object in the defined environment at the same points in time. The method may include obtaining, by a machine learning model, the image data and the radar data associated with the object in the defined environment. The method may include pairing each image datum with a corresponding radar datum based on a chronological occurrence of the image data and the radar data. The method may include generating, by the machine learning model, a three-dimensional motion representation associated with the object that is associated with the image data and the radar data.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 2A is a diagram illustrating an example system related to generating a three-dimensional motion representation according to the present disclosure;

DETAILED DESCRIPTION

Figure 1:
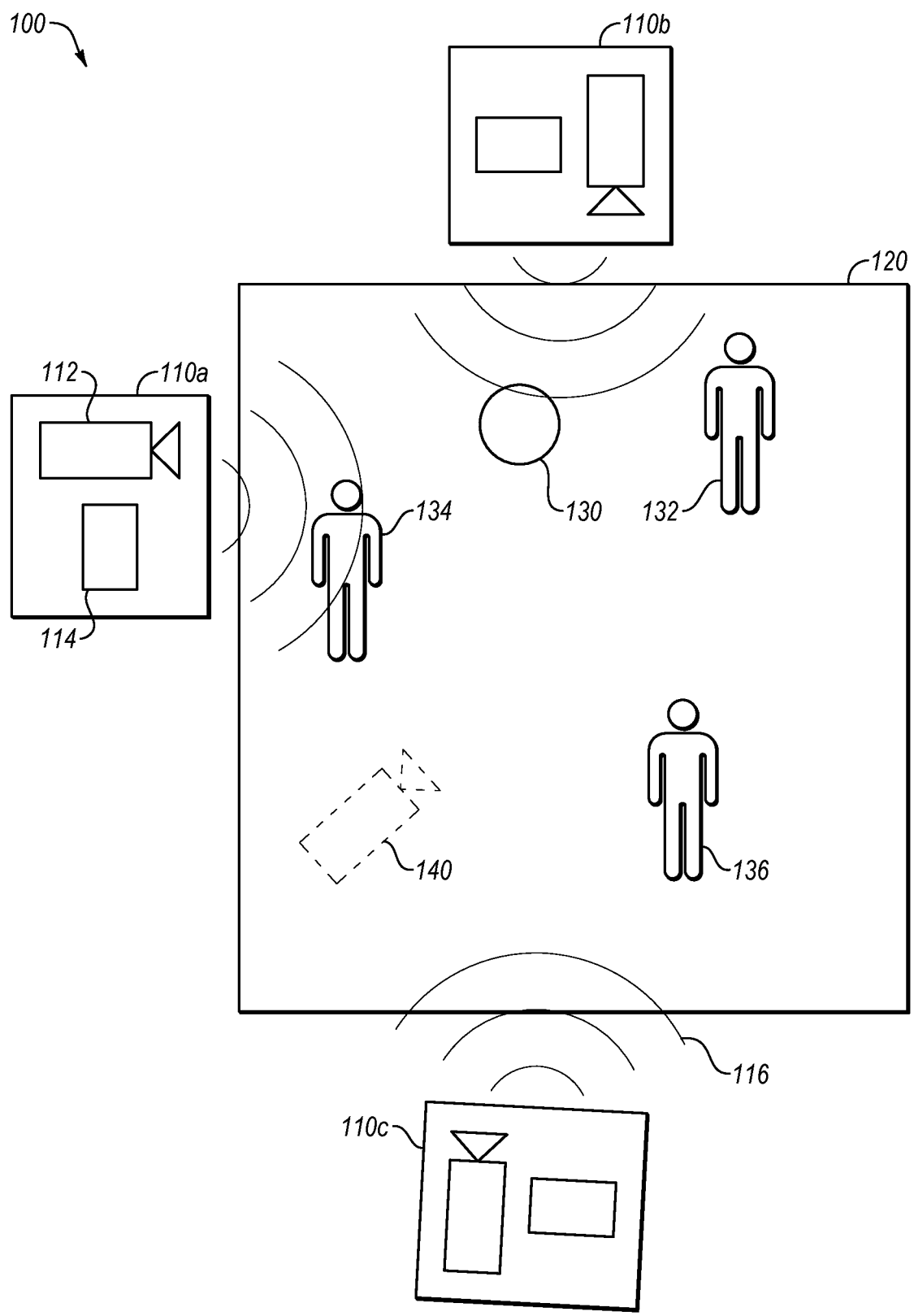
FIG. 1 illustrates an example system for placement of cameras and radars in a defined environment according to the present disclosure.

Radar technology may be used to detect and track movement of an object used in a particular sport. The radar technology may be used to measure various parameters of the object such as a position, a direction of movement, a speed, and/or a velocity of the object. Additionally, camera-based systems may be used to capture images of the object such that movement of the object may be observed and/or measured.

Existing radar sensors and cameras may be difficult to set up in a given environment for tracking movement of a moving object and include various disadvantages. Such radar systems may show limitations based on insufficient sensor range, vibrations affecting the radar sensors, and/or inclement weather conditions. Various camera systems may show limitations based on resolution of the camera, dependence on ambient light conditions, insufficient camera frame rate, etc. Additionally, calibration and placement of the radar sensors and/or cameras may affect the quality of the obtained information relating to the moving object such that precise calibration and specific placement of the radar sensors and/or cameras is required for accurate data collection.

Calibration of existing stereoscopic image-capturing systems estimates intrinsic parameters and extrinsic parameters of cameras included in the image-capturing systems. For example, the intrinsic parameters of the cameras may include specifications relating to sensors, lenses, and/or other components of the cameras, and the extrinsic parameters may include geographic positioning of the cameras, environmental conditions, etc. As such, existing image-capturing systems may require sensitive and accurate calibration of cameras. Additionally, such image-capturing systems may be restricted in terms of locations at which cameras may be positioned to capture image data from a given environment.

The present disclosure may be directed to, among other things, a method and/or a system including one or more radar-camera units configured to capture radar data and image data in a defined environment. The combination of radar data and image data as described in the present disclosure may reduce the sensitivity of camera calibration relative to existing image-capturing systems and/or remove the need to calibrate cameras altogether. Additionally or alternatively, the radar-camera units may be positioned in the defined environment with more flexibility than existing image-capturing systems such that more image data about the defined environment may be captured.

In some embodiments, the image data and radar data captured by the camera-radar units may be used to estimate camera parameters of a virtual camera at a specified location and angle. Images associated with the specified location and angle of the virtual camera may be projected based on the estimated camera parameters associated with the virtual camera, the image data, and/or the radar data.

Embodiments of the present disclosure are explained with reference to the accompanying figures.

FIG. 1 illustrates an example system 100 for placement of cameras and radars in a defined environment 120 according to the present disclosure. The environment 120 may include one or more camera-radar units 110, one or more objects 130, and/or one or more sports users 132-136. Each of the camera-radar units 110 may include a camera 112 and a radar unit 114 configured to transmit and/or receive electromagnetic pulses 116. The camera 112 and the radar unit 114 may work cooperatively to analyze characteristics of the objects 130 and/or the sports users 132-136 (collectively "moving object" or "moving objects"). Image data and/or radar data captured by the camera-radar units 110 may be used to simulate one or more virtual cameras 140.

Figure 4:
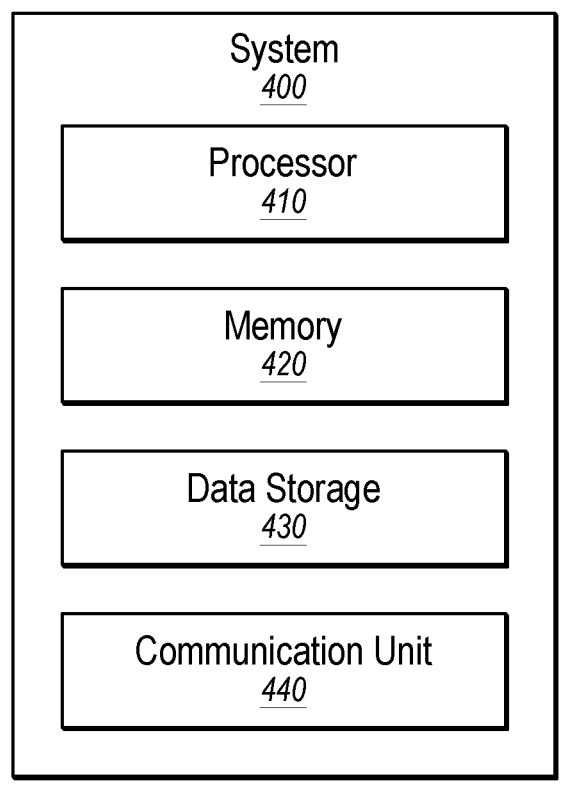
FIG. 4 is an example computing system.

Each camera-radar unit 110 may include a processor, a memory, and a communication device, such as a processor 410, a memory 420, and a communication unit 440 as further described in relation to FIG. 4. The operation of the camera-radar unit 110 may be controlled by the processor, and the processor may be in communication with each of the other components of the camera-radar unit 110. The components of the camera-radar unit 110 may work cooperatively using one or both of radar data obtained by the radar unit 114 and image data obtained by the camera 112 to analyze characteristics of a moving object. Any of the components of the camera-radar unit 110 may be in communication with each other; for example, the radar unit 114 may be in communication with the camera 112, and the camera 112 may be in communication with the memory and the communication device, etc. Additionally, while the camera-radar unit 110 is illustrated as a unitary device, one or more of the components may be distributed or may span across multiple devices.

In some embodiments, the system 100 may include at least two camera-radar units 110 configured to obtain image and/or radar data about motion of objects 130 and/or sports users 132-136 in the defined environment 120. In some embodiments, the camera-radar units 110 may be positioned outside of the defined environment 120 or on a periphery of the defined environment 120 such that each camera-radar unit 110 faces the defined environment 120. Positioning of a camera-radar unit 110 outside of or on the periphery of the defined environment 120 may facilitate capturing more moving objects in a field of view of the camera-radar unit 110 such that fewer camera-radar units 110 may be needed to capture motion at any given point in the defined environment 120. Additionally or alternatively, the camera-radar units 110 may be arranged at any given position within the defined environment 120.

The camera-radar units 110 may be positioned such that each camera-radar unit 110 included in the system 100 has a line of sight to the same moving objects. For example, a first camera-radar unit 110a and a second camera-radar unit 110b may each have a line of sight to the object 130 and/or the same sports users 132-136. In some embodiments, each camera-radar unit 110 having a line of sight to the same moving objects may capture image data and/or radar data from a different angle such that the same movement of a given moving object is captured from multiple perspectives.

Some defined environments 120 may include obstructions that block the lines of sight of one or more of the camera-radar units 110 such that the captured image data and/or the radar data associated with a given object moving past the obstructions appears non-continuous. In some embodiments, the obstructions may include other moving objects.

The camera-radar units 110 may be positioned to obtain and/or infer motion information about the moving objects in circumstances in which the lines of sight of the camera-radar units 110 to the moving objects are partially or fully obstructed. In some embodiments, additional camera-radar units 110 may be deployed to cover any blind spots in the field of view of existing camera-radar units 110. Additionally or alternatively, the motion of a partially or fully obstructed moving object may be inferred based motion data obtained before obstruction of the object and motion data obtained after obstruction of the object based on kinematic, dynamics, and/or ballistics modeling. For example, one or more camera-radar units 110 may obtain image data and/or radar data related to motion of a pitched ball. The line of sight between the camera-radar units and the ball may be obstructed by a wall for a duration of time. The image data and/or the radar data of the ball obtained before and after the ball is obstructed by the wall and the timing of acquisition of the image data and/or radar data may be compared to predict a trajectory of the ball during the duration of time in which the ball was obstructed by the wall.

In some embodiments including two or more camera-radar units 110, the camera-radar units 110 may be positioned such that the obtained image data and/or radar data associated with the same moving object include positional disparity when the moving object is detected at a midpoint between the camera-radar units 110. As such, the positioning of the camera-radar units 110 may be asymmetrical relative to the boundaries of the defined environment 120 to facilitate positional disparity between the camera-radar units 110. Asymmetry in camera-radar unit positioning may facilitate obtaining additional dimensionality (e.g., along an x-axis, a y-axis, and/or a z-axis of the defined environment 120) in the motion data associated with a given object and/or user.

In some embodiments, the camera-radar unit 110 may include a camera 112 and a radar unit 114 co-positioned in the same module. Co-positioning of the camera 112 and the radar unit 114 in the same module may facilitate co-locating of image data captured by the camera 112 and radar data captured by the radar unit 114 for a given object and accurate pairing of the image data and the radar data. Additionally or alternatively, the camera-radar unit 110 may include separate modules for the camera 112 and the radar unit 114. In some embodiments, separate positioning of the camera 112 and the radar unit 114 may decrease the number of camera-radar units 110 needed for the fields of view of the camera-radar units 110 to fully cover the defined environment 120. For embodiments with separate cameras and radar units, each camera may include a processor, a memory, and a communication unit, and each radar unit may likewise include a processor, a memory, and a communication unit.

In some embodiments, the field of view of the camera 112 and the radar unit 114 may be the same or may be different. In the case where the fields of view of the camera 112 and the radar unit 114 are different, a trigger mechanism may operate to ensure that the object 130 and/or the user 132-136 remains in the field of view of the camera 112 for as long as images are being captured.

In some embodiments, the camera-radar unit 110 may be configured to obtain image data and/or radar data at a designated framerate. For example, the camera-radar unit 110 may be configured to capture an image and/or sample radar data once per second, once per ten seconds, once per thirty seconds, once per minute, etc. Increasing the framerate of the camera-radar unit 110 may improve the accuracy of modeling the motion of the moving objects and/or facilitate capturing more details about the motion of the moving objects, while decreasing the framerate of the camera-radar unit 110 may reduce power consumption of the camera-radar unit 110. In these and other embodiments, the framerate of the camera-radar unit 110 may be designated based on user input. Additionally or alternatively, the framerate of the camera-radar unit 110 may be controlled by a processor based on operation of the camera-radar unit 110. For example, a particular processor may be configured to increase the framerate of a particular camera-radar unit in response to determining an insufficient amount of image data and/or radar data is being obtained by the particular camera-radar unit. In this example, the particular processor may be configured to decrease the framerate of the particular camera-radar unit in situations in which the processor determines energy should be conserved (e.g., when a battery providing energy to the particular camera-radar unit is running low).

The camera 112 may include any device, system, component, or collection of components configured to capture images. Although one camera 112 is illustrated in relation to each camera-radar unit 110 with reference to FIG. 1, any number of cameras may be contemplated. The camera 112 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements); for example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, eight megapixels, 15 megapixels, 20 megapixels, 50 megapixels, 100 megapixels, 200 megapixels, 600 megapixels, 1000 megapixels, etc.

The camera 112 may operate at certain framerates or be able to capture a certain number of images in a given time. The camera 112 may operate at a framerate of greater than or equal to about 30 frames per second. In a specific example, camera 112 may operate at a framerate between about 100 and about 300 frames per second. In some embodiments, a smaller subset of the available pixels in the pixel array may be used to allow for the camera 112 to operate at a higher framerate; for example, if the moving object is known or estimated to be located in a certain quadrant, region, or space of the pixel array, only that quadrant, region, or space may be used in capturing the image allowing for a faster refresh rate to capture another image. Using less than the entire pixel array may allow for the use of less-expensive cameras while still enjoying a higher effective framerate.

Various other components may also be included in the camera 112. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor.

Any number of a variety of triggers may be used to cause the camera 112 to capture one or more images of the moving object. By way of non-limiting examples, the camera 112 may be triggered when the moving object is known or estimated to be in the field of view of the camera 112, when the moving object first begins or modifies its movement (for example when a baseball is pitched, when a baseball is batted, when a golf ball is struck, when a tennis ball is served, when a cricket ball is bowled, etc.), when the moving object is detected at a leading row of pixels in the pixel array, etc. Another example of a trigger may be a persisting peak in a spectrum of reflected microwaves. For example, if there is consistently a peak at a given frequency known to be in an expected moving object frequency for a given duration of time, this may act as a triggering event.

In some embodiments, the camera 112 may have a field of view in which images may be captured. The field of view may correspond to the pixel array. In some embodiments, the field of view may be limited such that the moving object only spends a limited amount of time within the field of view. In such embodiments, the camera 112 may be triggered to capture images while the moving object is within the field of view. The time in which the moving object is within the field of view of the camera 112 may be referred to as an optimal photograph timeframe. In some embodiments, the optimal photograph timeframe may include when only the entire the moving object is within the field of view or may include when only a portion of the moving object is within the field of view. Other factors may also contribute to the optimal photograph timeframe, such as the distance between the image sensor and the moving object, the amount of illumination that may be provided by an illuminating feature, etc. For example, the optimal photograph timeframe may occur when the moving object is traveling between three meters and one meter away from the camera 112 as that may be where a flash of the camera 112 provides illumination of the moving object.

The radar unit 114 may include any system, component, or series of components configured to transmit one or more microwaves or other electromagnetic waves towards a moving object and receive a reflection of the transmitted microwaves back, reflected off of the moving object. The radar unit 114 may include a transmitter and a receiver. The transmitter may transmit a microwave through an antenna towards the moving object. The receiver may receive the microwave reflected back from the moving object. The radar unit 114 may operate based on techniques of Pulsed Doppler, Continuous Wave Doppler, Frequency Shift Keying Radar, Frequency Modulated Continuous Wave Radar, or other radar techniques as known in the art. The frequency shift of the reflected microwave may be measured to derive a radial velocity of the moving object, or in other words, to measure the speed at which the moving object is traveling towards the radar unit 114. The radial velocity may be used to estimate the speed of the moving object, the velocity of the moving object, the distance between the moving object and the radar unit 114, the frequency spectrum of the moving object, etc.

The radar unit 114 may also include any of a variety of signal processing or conditioning components; for example, the radar unit 114 may include an analog front end amplifier and/or filters to increase the signal-to-noise ratio (SNR) by amplifying and/or filtering out high frequencies or low frequencies, depending on the moving object and the context in which the radar unit 114 is being used. In some embodiments, the signal processing or conditioning components may separate out low and high frequencies and may amplify and/or filter the high frequencies separately and independently from the low frequencies. In some embodiments, the range of motion of the object may be a few meters to tens of meters, and thus, the radar bandwidth may be narrow.

The radar unit 114 may initially detect the object of interest when the object is within the field of view of the radar or when the object initially enters the field of view of the radar. In some embodiments, the radar signal is tracked for a pre-determined duration of time. At some triggering point during the pre-determined duration of time, the camera 112 is triggered to begin capturing images.

In some embodiments, one or more of the virtual cameras 140 may be simulated at a target location and angle based on the image data captured by the cameras 112 and/or the radar data captured by the radar unit 114. The image data and/or the radar data may be captured from two or more camera-radar units 110 including one or more regions of overlapping fields of view. Motion of the moving objects may be captured by the two or more camera-radar units 110 such that the motion of the moving objects is captured from the locations and angles corresponding to each of the camera-radar units 110.

The image data and/or the radar data captured from various locations and angles may facilitate estimating extrinsic parameters associated with the virtual cameras 140 relative the camera-radar units 110. For example, landmarks, boundary lines, field markers, and/or any other distinguishable features captured in the overlapping regions of the image data may be used to estimate the extrinsic parameters of the virtual cameras 140 relative to one another and/or relative to the camera-radar units 110. In some embodiments, the estimated extrinsic parameters of the virtual cameras 140 may facilitate projection of virtual image data from the location and angle of the virtual camera 140.

FIG. 2A is a diagram illustrating an example system 200 related to generating a three-dimensional motion representation 230 according to the present disclosure. The system 200 may include one or more sensor devices, such as a first sensor device 210a, a second sensor device 210b, and up to an Nth sensor device 210c. The sensor devices 210 may include a device the same as or similar to the camera-radar unit 110 described in relation to FIG. 1. Sensor data 215 may be collected by the sensor devices 210 and sent to a machine learning model 220. The machine learning model 220 may be configured and trained to output one or more three-dimensional motion representations 230 relating to moving objects in an environment (e.g., the defined environment 120) based on the obtained sensor data 215.

The machine learning model 220 may be trained using training sensor data to output the three-dimensional motion representations 230. In some embodiments, the training sensor data may include image data and/or radar data collected from a training environment in which the training environment includes more accurate data collection than the environment for which the three-dimensional motion representations 230 are output ("the analyzed environment"). In these and other embodiments, a number of cameras and/or a number of radar units configured to collect data in the training environment may be greater than a number of cameras and/or a number of radar units included in the analyzed environment. For example, the training environment may include six cameras and six radar units positioned to collect motion data about moving objects within the training environment, while the analyzed environment includes three cameras and three radar units. Increasing the number of cameras and/or radar units included in the training environment facilitates collection of more accurate motion data relating to the moving objects within the training environment, which may in turn improve the accuracy of the machine learning model 220 trained based on such data.

In these and other embodiments, the training environment and the analyzed environment may include the same defined environment. The cameras and/or radar units corresponding to the training environment and the cameras and/or radar units corresponding to the analyzed environment may be positioned to capture motion data from the same defined environment such that each of the cameras and/or radar units capture motion data about the same moving objects at the same points in time. Capturing motion about the same moving objects at the same points in time may improve training efficiency of the machine learning model 220 by providing stronger correlation between the training and analyzed motion data.

Additionally or alternatively, an image data recognition aspect and a radar data recognition aspect of the machine learning model 220 may be trained separately. In some embodiments, the image data recognition aspect of the machine learning model 220 may be trained to identify and track one or more moving objects, while the radar data recognition aspect of the machine learning model 220 may be trained to identify movement signatures (e.g., spectrum data) of the moving objects. The machine learning model 220 may then correlate the image data recognition aspect and the radar data recognition aspect based on the times at which the image data and the radar data were collected to output the three-dimensional motion representations 230.

In some embodiments, the machine learning model 220 trained according to the present disclosure may be configured to determine three-dimensional motion representations 230 for new objects not included in the training sensor data. In other words, the machine learning model 220 may be configured to determine three-dimensional motion representations 230 for objects not included in the training sensor data. For example, a particular machine learning model trained to model the three-dimensional motion of tennis rackets and tennis balls may be capable of modeling the three-dimensional motion of ping pong paddles and ping pong balls. As another example, a particular machine learning model trained to model body movements of athletes may be capable of modeling the body movements corresponding to athletes of varying heights, weights, physiques, ethnicities, genders, etc. irrespective of characteristics of users included in the image data and radar data used to train the particular machine learning model.

After training, the machine learning model 220 may obtain sensor data 215 including image data and/or radar sensor data and output one or more three-dimensional motion representations 230. In some embodiments, the machine learning model 220 may chronologically order image data of a moving object over a time period and determine a motion representation (e.g., an optical flow) of the moving object to model two-dimensional movement of the moving object over the time period. The radar data corresponding to the same moving object collected over the time period may be applied the motion representation to determine and model the three-dimensional motion of the moving object. In some embodiments, the three-dimensional motion representations 230 may be used for velocity analysis of the moving object, body-movement analysis (e.g., of a human user, a human appendage, etc.), or movement simulation of the object.

The machine learning model 220 may recognize and distinguish between two or more different moving objects based on the sensor data 215 obtained from a defined environment. In some embodiments, the machine learning model 220 may be configured to identify two or more moving objects based on image data included in the sensor data 215. The machine learning model 220 may be configured to match each of the identified moving objects with radar data included in the sensor data 215 captured at the same points in time as the image data in a physically realistic manner. For example, a first moving object may include a first baseball, and a second moving object may include a second baseball thrown at a steeper, upward angle than the first baseball. The machine learning model 220 may determine that the radar data (e.g., frequency signatures) corresponding to the second moving object should include characteristics indicating an upward movement, while the radar data corresponding to the first moving object should not include such characteristics The machine learning model 220 may chronologically pair the radar data with the image data associated with each of the moving objects accordingly. As another example, a first moving object and a second moving object may traverse the same trajectory, but the first moving object may include a higher velocity than the second moving object. The machine learning model 220 may determine that the radar data corresponding to the first moving object should include characteristics indicating a faster velocity, and pair the radar data with the image data associated with each of the moving objects accordingly.

In some embodiments, more than one moving object may be tracked, either purposefully or because there may be multiple moving objects that the radar may detect (e.g., other balls, birds, planes, people in the field of view). In the case of multiple moving objects, it may be difficult to track the correct moving objects; therefore, in one example, the radar used may be a narrow beam radar having a predefined beam-width. If the moving object is in the beam of the radar, the moving object will generate a Doppler frequency equivalent to the radial velocity. The moving objects tracked simultaneously may include, but are not limited to, the hand of the pitcher, the ball, the arm of the pitcher and/or the batter, the swing of a bat or golf club, and the like.

The detection may be based on calculating a signal-to-noise ratio (SNR). The identified frequency or frequencies may be associated with existing pre-determined radar tracks stored in a radar track pool based on proximity. Whether the identified frequency or frequencies are associated with pre-determined radar tracks may be assessed, and if no associations may be made, then a new radar track may be created and placed in the radar track pool.

If an association with an existing track is determined to be so, then the pre-associated radar track may be determined to be present in the radar track pool. At each iteration, the radar track data may be used to predict the next expected frequency detected. If the detection for a certain radar track fails for multiple iterations (e.g., the detection of one object among multiple objects, or distinguishing multiple objects from one another fails), then the radar track may be deleted from the radar track pool. On the other hand, if the radar track does not fail (e.g., an object is detected from a group of multiple objects, or multiple objects are distinguished from each other), then the radar track may be updated and entered into the radar track pool for a later association.

In some embodiments, the machine learning model 220 may be configured to selectively track and analyze motion of certain moving objects in a defined environment. For example, the machine learning model 220 may receive user input indicating to only track motion of a tennis ball in a tennis match, and movements of players and/or tennis rackets may be ignored. In these and other embodiments, the machine learning model 220 may be configured to recognize certain moving objects based on image-recognition training during the training process for the machine learning model 220.

In some embodiments, the machine learning model 220 may be configured to track the positioning of a moving object based on the image data associated with the moving object. In these and other embodiments, a defined environment in which the motion data corresponding to the moving object is collected may include one or more markings that may be referenced by the machine learning model 220 to determine the positioning of the moving object relative to the defined environment. For example, a particular defined environment may include a basketball court including well-delineated floor markings that the machine learning model 220 may reference to track the positioning of a basketball. In this example, tracking the two-dimensional positioning of the basketball may be facilitated by the image data of the basketball and the relative positioning of the floor markings. A height of the basketball may be required for modeling the three-dimensional motion of the basketball, and such height data may be determined based on collected radar data associated with the basketball.

In some embodiments, the machine learning model 220 may be configured to track and analyze motion data associated with a moving object that includes partial and/or entire obstruction of the moving object at any point during movement of the object. The machine learning model 220 may be trained to identify breaks in image data associated with a given moving object to determine whether the given moving object is partially or entirely obstructed at any point in the trajectory of the given moving object. In some embodiments, the machine learning model 220 may be configured to predict the trajectory of the partially or entirely obstructed moving object based on image data and/or radar data collected before and after obstruction of the moving object based on kinematic, dynamic, and/or ballistic modeling of the moving object.

Figure 2B:
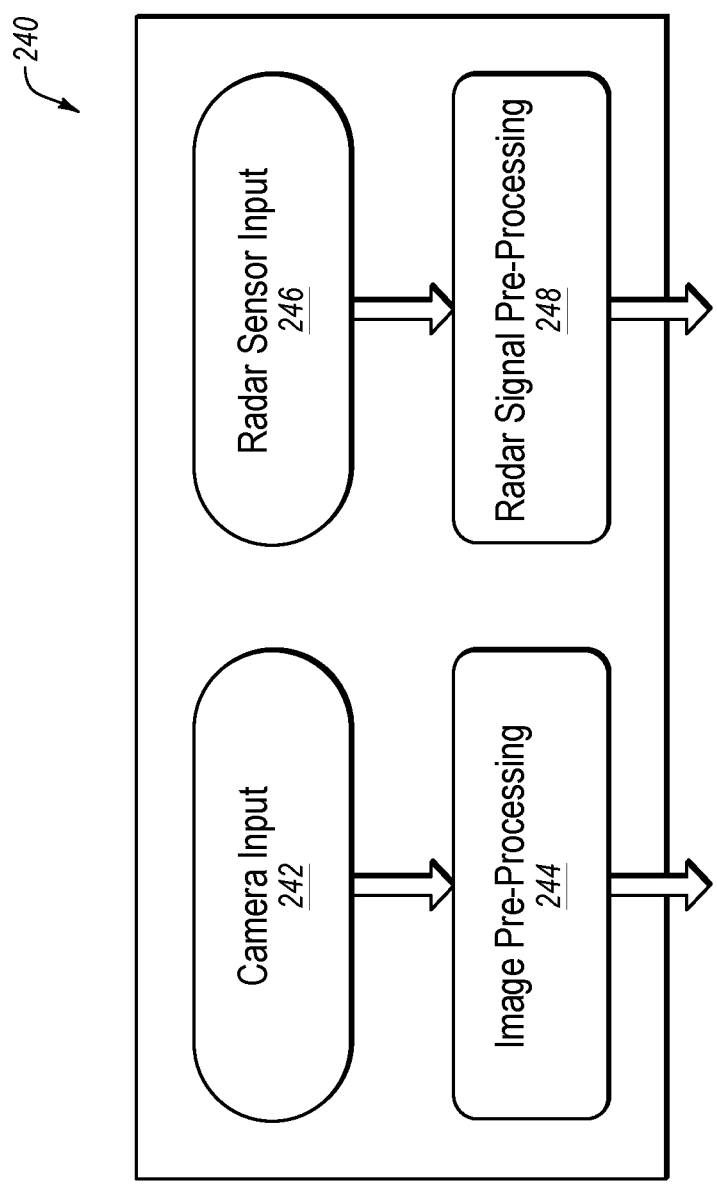
FIG. 2B is a diagram of a sensor device according to the present disclosure.

FIG. 2B is a diagram of a sensor device 240 according to the present disclosure. The sensor device 240 may represent any of the sensor devices illustrated in FIG. 2A, such as the first sensor device 210a, the second sensor device 210b, and/or the Nth sensor device 210c. The sensor device 240 may include camera input 242 (e.g., image data) and/or radar sensor input 246 (e.g., radar data). In some embodiments, the camera input 242 may be pre-processed to generate image pre-processing data 244, and/or the radar sensor input 246 may be pre-processed to generate radar signal pre-processing data 248. Although illustrated as a single sensor device, the camera input 242 and the radar sensor input 246 may be obtained by separate sensor devices such that each sensor device includes only the camera input 242 or only the radar sensor input 246.

Pre-processing of the camera input 242 and/or the radar sensor input 246 may include analyzing and revising the obtained image data and/or radar data prior to providing the data to a machine learning model. In some embodiments, pre-processing of the camera input 242 and/or the radar sensor input 246 may include identifying and removing erroneous data. Image data and/or radar data obtained by the sensor device 240 including impossible data values (e.g., negative speed detected by a radar unit), improbable data values, noisy data, etc. may be deleted during image pre-processing 244 and/or radar signal pre-processing 248 such that the deleted data is not obtained by the machine learning model. Additionally or alternatively, the image data and/or radar data may include missing data pairings in which an image captured at a particular point in time has no corresponding radar data or vice versa; such missing data pairings may be deleted during data pre-processing. In these and other embodiments, the image pre-processing 244 and/or the radar signal pre-processing 248 may include formatting the data obtained by the sensor device 240 such that the machine learning model may obtain and analyze the pre-processed image data and/or radar data.

Figure 3A:
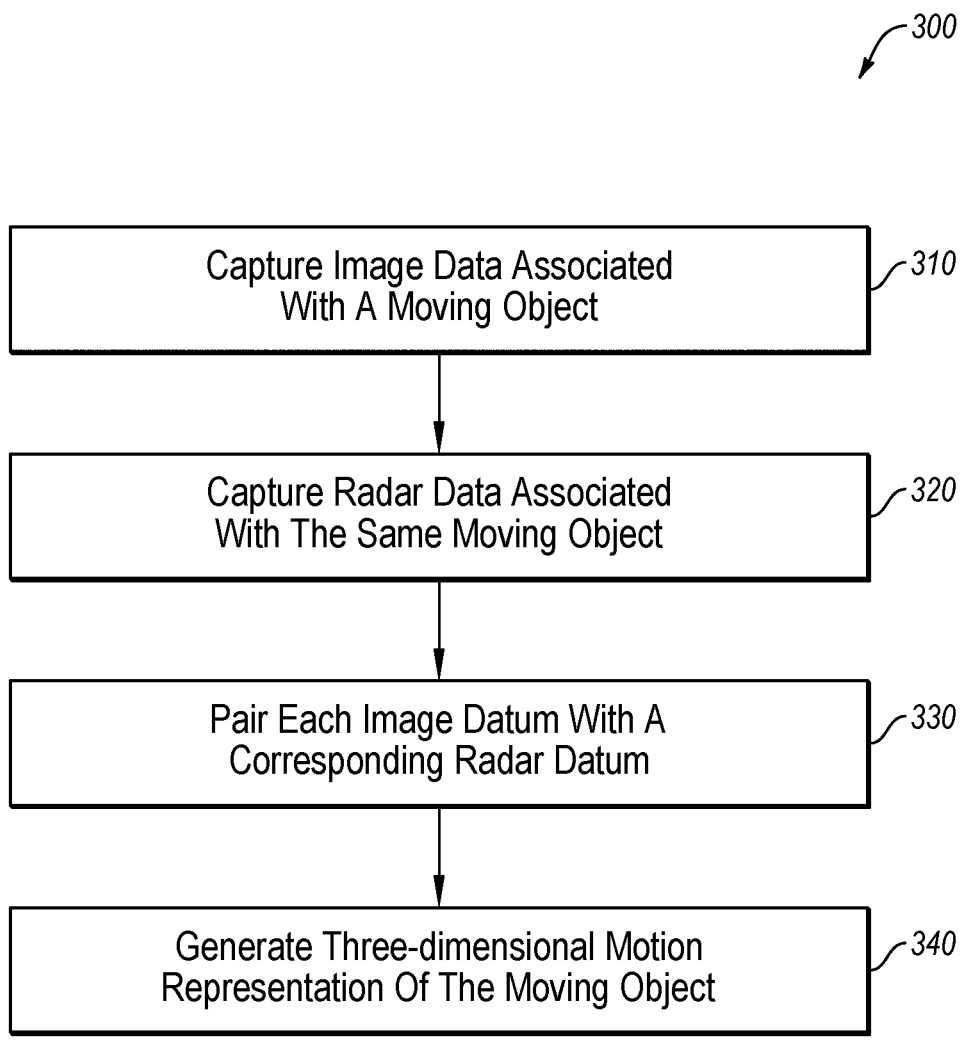
FIG. 3A is a flowchart of an example method of generating a three-dimensional motion representation of a moving object according to the present disclosure.

FIG. 3A is a flowchart of an example method 300 of generating a three-dimensional motion representation of an object according to the present disclosure. The method 300 may be performed by any suitable system, apparatus, or device. For example, the sensor devices 210a-c and/or the machine learning model 220 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 310 where image data associated with a moving object may be captured. In some embodiments, the image data may be captured by a camera, such as the camera 112 of the camera-radar unit 110 as described above in relation to FIG. 1. In these and other embodiments, a moving object may be detected within a field of view of a radar unit, which may trigger the camera to begin taking photos of the moving object. When pre-determined tracking conditions are satisfied, the camera is triggered to begin taking photographs. In one example, the trigger to begin taking photographs is that a pitched ball appears field of view of the radar. Simultaneously, the motion of the hand pitching the ball may be detected, and thus, the motion of the ball may be tracked both as an incoming object and an outgoing object. In an additional or alternative example, the trigger to begin taking photographs may be identifying the motion of a ball when hit from off-a-tee. In this example, the radar signal from swinging of the hand is detected and as a result triggers the camera.

In an addition or alternative example, the trigger to begin taking photographs may be detection of the hand swing. For example, a camera-radar unit may be placed on a tripod in such a way that the hands of a user swinging, e.g., a bat or a golf club, are visible. The swing of the hands can be tracked and the camera can be triggered to begin taking photographs. In an additional or alternative example, the swing of the hands may be tracked, and the swing data may be correlated with a pre-defined mask until a threshold parameter is met (e.g., amplitude, speed, etc.). The correlation signal may also be a time-domain reference signal.

In some embodiments, when the camera is triggered to begin taking photographs, the system may take N photographs, where N may be pre-determined by a user, calculated by the system based on previous rounds of photography, determined by a manufacture, and/or determined by any number of conditions which may alter the number of photos taken.

In some cases including use of a single camera, it may be useful to have previous knowledge about the shape and size of the object; for example, that the object is a baseball as opposed to a golf ball or a football, having an approximate diameter of 2.5 inches. In some cases including use of multiple cameras (e.g., a stereo camera system), knowing the shape and size of the object of interest beforehand may not be needed, but may speed up processing if the data can be provided ahead of time.

In some embodiments, prior knowledge, based on the motion-based trigger mechanism, that the object is or will be in motion with respect to a static background (e.g., the motion of a hit ball across a static baseball field environment) may be available. Thus, in one example, detecting the object of interest may be done by using the first photograph of a series of captured photographs as a background image, and then subtracting images from each subsequent photograph from the initial background photograph. The subtraction operation may be followed by a thresholding and/or applying a filter to remove noise and thus detect the object against the background.

In another embodiment, detecting the object in the photographs may be enabled by first selecting a photograph from the series of photograms as the "starting" image. Subsequently, images from the photograph are subtracted from photographs occurring before the "starting" photograph and photographs occurring after the "starting" photograph. The different photographs are multiplied to highlight the portions of the photographs that are common to both the before and after images. The result of this multiplication further highlights the region of interest inside each photograph where the moving object can be found. If the moving object has well-defined characteristics (e.g., a circular shape, an oval shape, etc.), pattern-matching using pre-known patterns may facilitate determination of the moving object in the images.

In another embodiment, detecting the object may further include using a Hough transform for objects that may be parameterized using known parameters; for example, a circle has three parameters (i.e., radius, and horizontal and vertical position of the circle's center); an ellipse has four parameters (i.e., the major axis, the minor axis, and horizontal and vertical positions of the ellipse's center). Once the moving object is detected as being present in the images, the parameters of interest may be stored in an array, with each entry having a time-stamp (e.g., using an internal clock of the system 100 or another timing device) that may aid in tracking the path of the moving object.

At block 320, radar data associated with the same moving object for which image data was captured may be obtained. In some embodiments, the radar data may be captured by a radar unit, such as the radar unit 114 of the camera-radar unit 110 as described above in relation to FIG. 1. In some embodiments, radar data may include two analog components: an in-phase component (or the I-Channel) and a quadrature component (or the Q-channel). When taken together, the in-phase component and the quadrature component form a complex signal s (t), where:

$$s(t)=I(t)+iQ(t), \quad (3)$$

where i is equal to $\sqrt{-1}$. The in-phase component and the quadrature component are sampled using an analog-to-digital converter at a sampling frequency $F_s$. The components may be pre-filtered and amplified as needed before sampling. After sampling a high order Finite Impulse Response (FIR) digital filter is applied to each channel. In some embodiments, an Infinite Impulse Response Filter (IIR) may be applied to the sample instead of the FIR filter. In some cases, the filter removes low frequency motion generated by, for example, the motion of an individual (e.g., the pitcher or the batter, in this example), limb motion other than the motion of the limb of interest, and the like. At this point, the data may be in the time-domain, and using moving window N-point Fast Fourier Transform (FFT), the time-domain data is converted to time-frequency domain data. To generate a smooth spectrum with few artifacts of finite-duration windowing and reduced spectral leakage windowing functions such as Hamming, Blackman, Kaiser, and the like, may be applied to pre-multiply the time-domain data before taking FFT.

The raw data may be captured in a camera-coordinates system, but should be converted to a world-coordinates system, where the world-coordinates system may be spherical coordinates or Cartesian coordinates, for example. In order to convert the data to the world-coordinate system, the camera position and orientation are used in order to construct a camera-to-world coordinates transformation matrix: $R_C^W$. The camera-to-world coordinate matrix may be a 4×4 matrix containing associated rotations and translations used to convert any vector from the camera into the selected world-coordinate system. A vector in world coordinates may be obtained by the following equation:

$$S^W = R_C^W S^C \quad (4)$$

where $S^W$ is the transformed vector into world coordinates, and $S^C := [S_x S_y S_z 1]$ is a vector in camera coordinates. The vector is three-dimensional, however "1" may be appended as a 4th dimension to cater for translations, as $R_C^W$ is 4×4.

For a regularly shaped object (e.g., baseball, golf ball), having a radius, $r_b$, the spherical coordinates in the camera frame of reference, $\beta_n$, $\theta_{n,\ and\ \phi_n}$, are given by:

$$\rho_n = \frac{r_b}{\theta_b} \quad (5)$$

$$\theta_n = \frac{x_n^i}{\Theta_F} \quad (6)$$

$$\phi_n = \frac{y_n^i}{\Theta_F} \quad (7)$$

where $\theta_b$ is the angle subtended by the object, given by $$\theta_b = \frac{2r\Theta_F}{L},$$

where r is the radius of the object in pixel, L is the total length of the image, $\Theta_F$ is the field of view of the lens, $x_n^i$ and $y_n^i$ represent the raw image x and y pixel values of the center location of the nth object.

The trajectory of the moving object may be estimated and parameters of interest may be calculated from the estimated trajectory, where the parameters of interest may include speed, velocity, rotation, axis of rotation, speed of rotation, vertical angle of elevation, azimuth angle, trajectory, release angle, etc.

At block 330, each image datum may be paired with a corresponding radar datum associated with the same moving object as described in further detail below in relation to FIG. 3B. At block 340, one or more three-dimensional motion representations of the moving object may be generated based on the paired image data and radar data as described in further detail below in relation to FIG. 3B.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 3B:
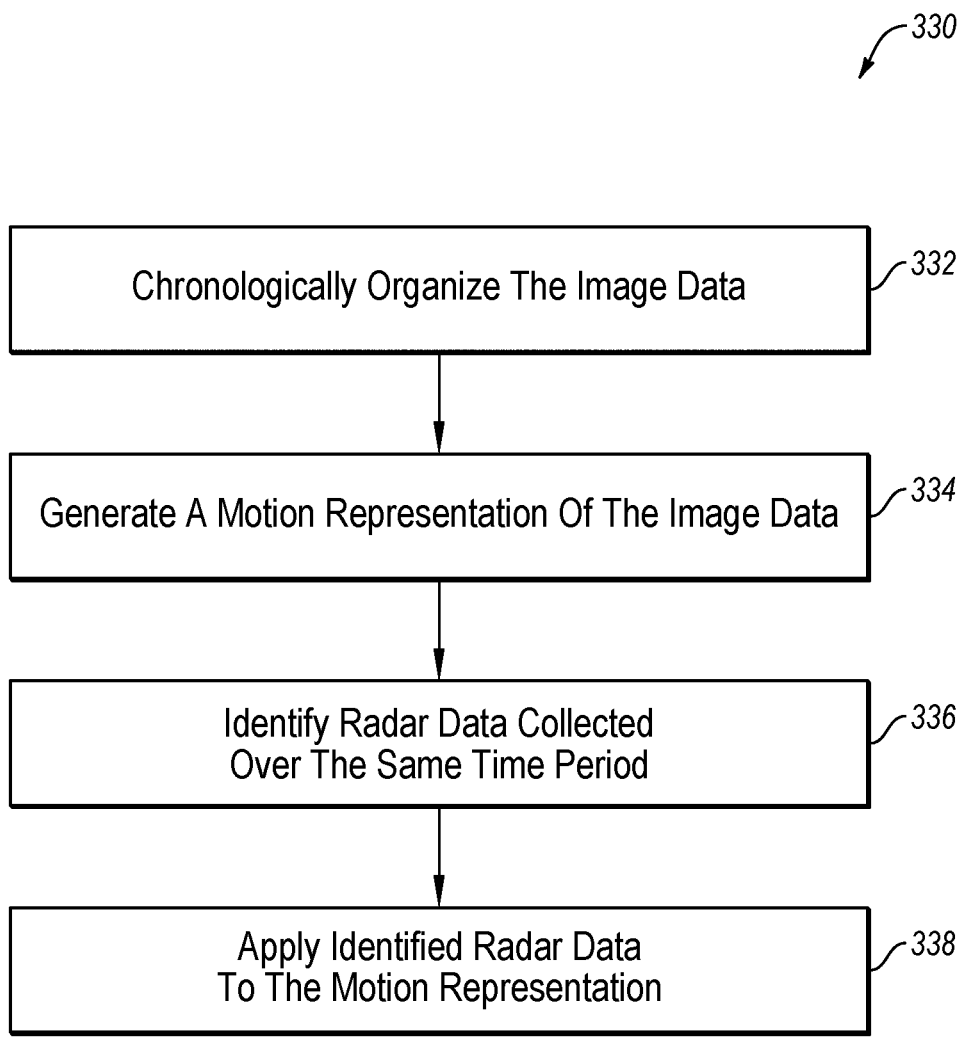
FIG. 3B is a flowchart of an example method of pairing each image datum with a corresponding radar datum to generate the three-dimensional motion representation of the moving object according to the present disclosure.

FIG. 3B is a flowchart of an example method of performing operations at blocks 330 and 340 of method 300 for pairing each image datum with a corresponding radar datum according to the present disclosure. The example method may be performed by any suitable system, apparatus, or device. For example, the sensor devices 210a-c and/or the machine learning model 220 may perform one or more of the operations associated with the operations at blocks 330 and 340. Although illustrated with discrete blocks, the operations associated with one or more of the blocks 330 and 340 may be divided into additional blocks, combined into fewer blocks, or eliminated, depending on the particular implementation.

At block 332, the image data may be chronologically organized. Image data associated with a moving object collected by a camera may include a timestamp indicating when the image was captured. In some embodiments, the camera may include an internal clock from which the timestamp may be determined. Additionally or alternatively, the camera may determine a relative timestamp at which a first image is assigned a timestamp of time zero ("$t_0$"), and subsequent images are assigned timestamps based on the framerate of the camera and the timestamp of the previous image. For example, a particular camera including a framerate of 1 Hz may capture one image per second such that a timestamp corresponding to a second image indicates a time of one second, a timestamp corresponding to a third image indicates a time of two seconds, a timestamp corresponding to a tenth image indicates a time of nine seconds, etc.

At block 334, a motion representation of one or more moving objects may be generated based on the image data. The motion representation may include preprocessing of the image data to determine an optical flow, optical tracking, image segmentation and tracking, etc. of the moving objects. For example, the optical flow may be generated based on the chronologically organized image data. The chronologically ordered images of the moving object may be collated as a single image representing a two-dimensional trajectory of the moving object over a time period based on a timestamp associated with a first image included in the optical flow and a timestamp associated with a last image included in the optical flow.

At block 336, radar data collected over the same time period as the image data may be identified. Radar data associated with a moving object collected by a radar unit may include a timestamp indicating when the radar data was captured. In some embodiments, the radar unit may include an internal clock from which the timestamp may be determined. Additionally or alternatively, the radar unit may determine a relative timestamp at which a first radar datum is assigned a timestamp of time zero ("$t_0$"), and subsequent radar data are assigned timestamps based on the framerate of the radar unit and the timestamp of the previous radar datum.

At block 338, the identified radar data may be applied to the two-dimensional motion representation of the moving objects to generate a three-dimensional motion representation of the moving object. Application of the radar data to the two-dimensional motion representation may provide information describing the moving object in a third dimension that was previously excluded by the two-dimensional motion representation. In some embodiments, each radar datum may be paired with a corresponding image having a matching timestamp. Additionally or alternatively, in situations where a radar datum does not have a corresponding image to match with, the radar datum may be paired with two or more corresponding adjacent images in the motion representation of the moving object in which a first adjacent image includes a timestamp before capture of the radar datum and a second adjacent image includes a timestamp after capture of the radar datum.

Modifications, additions, or omissions may be made to the operations at block 330 without departing from the scope of the disclosure. For example, the designations of different elements in the manner described is meant to help explain concepts described herein and is not limiting. Further, the operations at block 330 may include any number of other elements or may be implemented within other systems or contexts than those described.

FIG. 4 illustrates an example computing system 400, according to at least one embodiment described in the present disclosure. The computing system 400 may include a processor 410, a memory 420, a data storage 430, and/or a communication unit 440, which all may be communicatively coupled. Any or all of the sensor devices 210a-c of FIG. 2A may be implemented as a computing system consistent with the computing system 400.

Generally, the processor 410 may include any suitable computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform the method 300 of FIG. 3A. For example, the processor 410 may capture image data associated with a moving object, capture radar data associated with the same moving object, pair each image datum with a corresponding radar datum, and/or generate one or more three-dimensional motion representations of the moving object.

The memory 420 and the data storage 430 may include computer-readable storage media or one or more computer-readable storage mediums for carrying or having computer-executable instructions or data structures stored thereon. Such computer-readable storage media may be any available media that may be accessed by a computer, such as the processor 410. For example, the memory 420 and/or the data storage 430 may store obtained image data and/or radar data. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The embodiments described in the present disclosure may include the use of a computer including various computer hardware or software modules. Further, embodiments described in the present disclosure may be implemented using computer-readable media for carrying or having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    training, with at least one processor, a machine learning model in a training environment, to:
        identify and track a moving object based on training image data, and
        identify movement signature of the moving object based on training radar data;
    capturing image data associated with the moving object in an analyzed environment at a plurality of points in time;
    capturing radar data associated with the moving object in the analyzed environment at the plurality of points in time;
    obtaining, by the trained machine learning model, the image data and the radar data associated with the moving object in the analyzed environment;
    pairing, with the at least one processor, each image datum with a corresponding radar datum based on a chronological occurrence of the image data and the radar data in the analyzed environment; and
    generating, by the trained machine learning model, a three-dimensional motion representation relating to the moving object that is associated with the image data and the radar data;
    wherein a number of physical devices configured to collect training data in the training environment is greater than a number of physical devices in the analyzed environment and wherein the physical devices include at least one camera unit and one radar unit;
    wherein the trained machine learning model is configured to recognize and distinguish between two or more different moving objects based on sensor data obtained from the analyzed environment;
    wherein the trained machine learning model is configured to match the image data of each of the two or more different moving objects with the radar data captured at same points in time with the image data, wherein the trained machine learning model is configured to determine that the radar data corresponding to first one of the two or more different moving objects includes first frequency signature characteristics indicating movement corresponding to the first one of the two or more different moving objects, and that the radar data corresponding to second one of the two or more different moving objects excludes the first frequency signature characteristics.

2. The method of claim 1, wherein generating the three-dimensional motion representation associated with the object that is associated with the image data and the radar data comprises:
    organizing the image data chronologically;
    generating an optical flow based on the chronologically organized image data;
    identifying radar data collected over a same time period as the image data; and
    applying the identified radar data to the optical flow based on chronological occurrence of the radar data.

3. The method of claim 1, wherein the three-dimensional motion representation associated with the object includes at least one of: velocity analysis of the object, body-movement analysis, or movement simulation of the object.

4. The method of claim 1, wherein the image data includes a plurality of two-dimensional continuous frames of the object.

5. The method of claim 1, wherein the radar data includes at least one of: distance data, velocity data, or frequency data associated with the object.

6. The method of claim 1, wherein the object includes at least one of: a ball, a sports apparatus, a human appendage, or a human.

7. The method of claim 1, wherein the three-dimensional motion representation associated with the object includes simulating virtual image data, wherein simulating the virtual image data includes:
    identifying a location and an angle associated with a virtual camera;
    estimating one or more extrinsic parameters associated with the virtual camera based on the captured image data and the captured radar data; and
    generating the virtual image data at the identified location and angle of the virtual camera.

8. A system for capturing and analyzing motion, comprising a computing system communicatively coupled to one or more cameras and one or more radar sensors, the computing system configured to:
    train a machine learning model in a training environment, to:
        identify and track a moving object based on training image data, and
        identify movement signature of the moving object based on training radar data;
    obtain, by the trained machine learning model, image data associated with the moving object in an analyzed environment at a plurality of points in time from the one or more cameras;
    obtain, by the trained machine learning model, radar data associated with the moving object in the analyzed environment at the plurality of points in time from the one or more radar sensors;
    pair, by the trained machine learning model, each image datum with a corresponding radar datum based on chronological occurrence of the image data and the radar data in the analyzed environment; and
    generate, by the trained machine learning model, the three-dimensional motion representation relating to the moving object that is associated with the image data and the radar data;

wherein a number of physical devices configured to collect training data in the training environment is greater than a number of physical devices in the analyzed environment and wherein the physical devices include at least one camera unit and one radar unit;

wherein the trained machine learning model is configured to recognize and distinguish between two or more different moving objects based on sensor data obtained from the analyzed environment;

wherein the trained machine learning model is configured to match the image data of each of the two or more different moving objects with the radar data captured at same points in time with the image data, wherein the trained machine learning model is configured to determine that the radar data corresponding to first one of the two or more different moving objects includes first frequency signature characteristics indicating movement corresponding to the first one of the two or more different moving objects, and that the radar data corresponding to second one of the two or more different moving objects excludes the first frequency signature characteristics.

9. The system of claim 8, wherein generating the three-dimensional motion representation associated with the object that is associated with the image data and the radar data comprises:
organizing the image data chronologically;
generating an optical flow based on the chronologically organized image data;
identifying radar data collected over a same time period as the image data; and
applying the identified radar data to the optical flow based on chronological occurrence of the radar data.

10. The system of claim 8, wherein the three-dimensional motion representation associated with the object includes at least one of: velocity analysis of the object, body-movement analysis, or movement simulation of the object.

11. The system of claim 8, wherein the image data includes a plurality of two-dimensional continuous frames of the object.

12. The system of claim 8, wherein the radar data includes at least one of: distance data, velocity data, or frequency data associated with the object.

13. The system of claim 8, further comprising:
one or more cameras configured to collect image data within a defined environment; and
one or more radar sensors configured to collect radar data within the defined environment.

14. The system of claim 8, wherein the three-dimensional motion representation associated with the object includes simulating virtual image data, wherein simulating the virtual image data includes:
identifying a location and an angle associated with a virtual camera;
estimating one or more extrinsic parameters associated with the virtual camera based on the captured image data and the captured radar data; and
generating the virtual image data at the identified location and angle of the virtual camera.

15. One or more non-transitory computer-readable storage media configured to store instructions that, in response to being executed, cause a system to perform operations, the operations comprising:
training a machine learning model in a training environment, to:
identify and track a moving object based on training image data, and
identify movement signature of the moving object based on training radar data;
capturing image data associated with the moving object in an analyzed environment at a plurality of points in time;
capturing radar data associated with the moving object in the analyzed environment at the plurality of points in time;
obtaining, by the trained machine learning model, the image data and the radar data associated with the moving object in the analyzed environment;
pairing each image datum with a corresponding radar datum based on chronological occurrence of the image data and the radar data in the analyzed environment; and
generating, by the trained machine learning model, the three-dimensional motion representation relating to the moving object that is associated with the image data and the radar data;
wherein a number of physical devices configured to collect training data in the training environment is greater than a number of physical devices in the analyzed environment and wherein the physical devices include at least one camera unit and one radar unit;
wherein the trained machine learning model is configured to recognize and distinguish between two or more different moving objects based on sensor data obtained from the analyzed environment;
wherein the trained machine learning model is configured to match the image data of each of the two or more different moving objects with the radar data captured at same points in time with the image data, wherein the trained machine learning model is configured to determine that the radar data corresponding to first one of the two or more different moving objects includes first frequency signature characteristics indicating movement corresponding to the first one of the two or more different moving objects, and that the radar data corresponding to second one of the two or more different moving objects excludes the first frequency signature characteristics.

16. The one or more non-transitory computer-readable storage media of claim 15, wherein generating the three-dimensional motion representation associated with the object that is associated with the image data and the radar data comprises:
organizing the image data chronologically;
generating an optical flow based on the chronologically organized image data;
identifying radar data collected over a same time period as the image data; and
applying the identified radar data to the optical flow based on chronological occurrence of the radar data.

17. The one or more non-transitory computer-readable storage media of claim 15, wherein the three-dimensional motion representation associated with the object includes at least one of: velocity analysis of the object, body-movement analysis, or movement simulation of the object.

18. The one or more non-transitory computer-readable storage media of claim 15, wherein the image data includes a plurality of two-dimensional continuous frames of the object.

19. The one or more non-transitory computer-readable storage media of claim 15, wherein the radar data includes at least one of: distance data, velocity data, or frequency data associated with the object.

20. The one or more non-transitory computer-readable storage media of claim 15, wherein the three-dimensional motion representation associated with the object includes simulating virtual image data, wherein simulating the virtual image data includes:
- identifying a location and an angle associated with a virtual camera;
- estimating one or more extrinsic parameters associated with the virtual camera based on the captured image data and the captured radar data; and
- generating the virtual image data at the identified location and angle of the virtual camera.

\* \* \* \* \*